E. WHEELER.

SLEEPING CAR.

No. 1,043. Reissued Sept. 18, 1860.

UNITED STATES PATENT OFFICE.

ELI WHEELER, OF ELMIRA, NEW YORK.

IMPROVEMENT IN SLEEPING-CARS FOR RAILROADS.

Specification forming part of Letters Patent No. 21,099, dated August 3, 1858; Reissue No. 1,043, dated September 18, 1860.

*To all whom it may concern:*

Be it known that I, ELI WHEELER, of Elmira, in the county of Chemung and State of New York, have invented a new and useful Improvement in Convertible Seats for Sleeping-Cars; and I do hereby declare that the following is a full, clear, and exact description of the same, reference being had to the accompanying drawings, making a part of this specification, in which—

Figure 2:
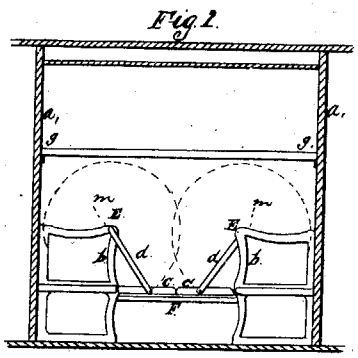
Figure 1:
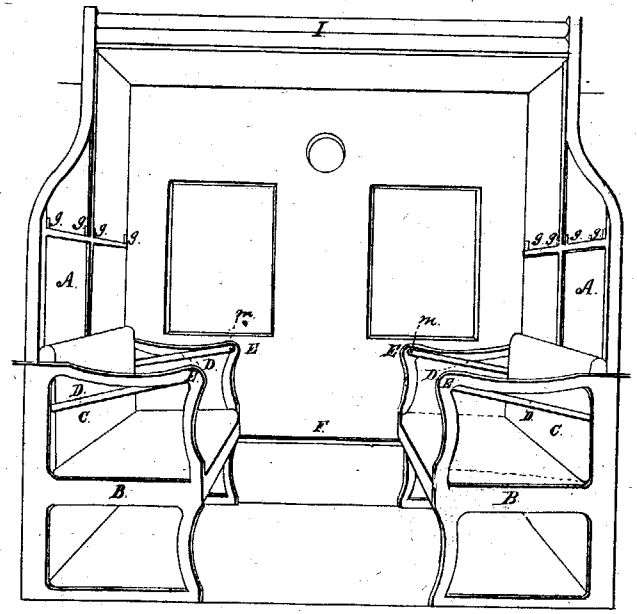
Figure 4:
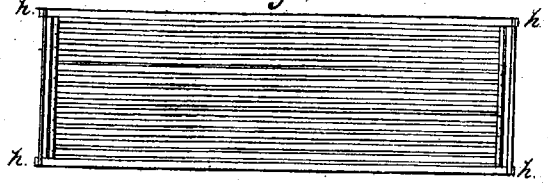
Figure 3:
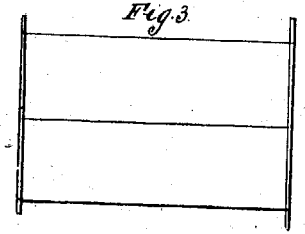

Figure 1 is a perspective view of a compartment of a railroad-car furnished with two of my improved convertible seats, which will comfortably accommodate four persons. Fig. 2 is a side view of the same compartment so fitted up and its seats so adjusted as to comfortably accommodate four persons with couches to sleep upon. Fig. 3 shows the backs of the seats brought together so as to convert the seats into a sleeping-couch, as in Fig. 2. Fig. 4 shows the under side of half of the upper couch.

Similar letters of reference in each of the several figures indicate corresponding parts.

The object of my improvement is to so simplify the mode of arranging and adjusting convertible car-seats that the most unskillful passenger may be able to convert his seat into a sleeping-couch with the greatest convenience and in a moment's time, and again with equal facility readjust it, so as to have it answer as a chair, my improvement avoiding the necessity of decreasing the width existing between each pair of seats, as is the case when one back or one cushion surface is used to fill the space between two seats, and also bringing the couch when formed entirely within the compartment or berth, instead of having one portion extend a considerable distance beyond the back edge of one of the seats in such manner as to render impracticable the construction of the car-compartments separate.

In the construction of sleeping-car seats the leading object seems to have been, with those who have preceded me, to retain the ordinary style of reversible day-car seat, and thus not have the car very different in appearance from the ordinary day-car, whereas my object has been just the reverse, the seats being arranged in pairs facing each other, and divided by partitions six feet apart, and arranged so as not to be reversible, the leading feature or idea being that of nearly permanent or semi-state-rooms for sleeping purposes, while the seats or contrivances for sitting are incidental, while in that of others the seats are the principal feature, and the couches incidental.

To be a little more explicit, in the car seats of J. B. Creighton, patented in 1858, the backs are pivoted to the arms, which arms have a series of hooks or catches by which the backs can be sustained at different angles or lie flat down between the seats, thus forming a continuous unbroken platform from end to end of the car. Upon this platform passengers are expected to lie, the heads and feet of each successive tier of necessity being in contact without any division or privacy for age, sex, or condition, nor are any divisions possible by his arrangement, the backs being reversible prevent it. Again, there is no possible arrangement for bedding, the space under the reversible seats being necessary for the feet of the passengers, and, in fact, the whole arrangement showing that the leading feature or idea, as hereinbefore stated, is that of an open reversible car-seat.

To enable others skilled in the art to make and use my invention, I will proceed to describe its construction and operation.

I divide an ordinary passenger car into compartments, as shown in Figs. 1 and 2, by partitions A A *a a*, six feet (more or less) apart. These compartments are left open fronting the passage way through the length of the car.

B B *b b* show the frame of a common cushioned car-seat; C C *c c*, the backs of the seats upholstered on the inside. D D *d d* are levers by which the backs of the seats may be moved and partly sustained after they have been adjusted. The fulcrum *m* of each lever is at the front end of the arm of the seat E, by which adjustment of it the backs in turning over, as shown by the dotted arc of a circle in Fig. 2, come together, as seen in Fig. 3, and exactly fill the space between the seats, thus forming a couch. The outside ends of the backs rest upon a cleat, F, Fig. 1. The bottom cushions of the seats serve as a continuation to the cushioned surface formed by the backs, or, if higher than the same, will serve as pillows.

The upper couch is constructed in two parts, the under side of one of which is shown in Fig. 4.

The sides and ends of the parts are made of wood, but slightly elastic, the center slats thinner and more elastic, fastened at the ends by transverse pieces of wood or metal, and the whole upholstered on the upper side. At a distance of three feet (more or less) above the lower couch are made fast to the partition angle plates of metal (denoted by the letter *g* in Figs. 1 and 2) as resting places and supports for the corners of the couch *h* when used.

When the upper couch is not in actual use, the pieces composing it may be laid away upin the shelf.

Having described my sleeping-car seats, I deem it necessary, before stating my claim, to say that it is not my invention to fill up the space between a pair of car-seats (not inclosed) with a single cushion resting flat upon the bottom cushion of one of the seats during the time that the seats are adjusted for sitting purposes, (this belongs to H. B. Meyer;) also that it is not my invention to use one cushioned back of a car-seat for filling up the space between two seats, (this belongs to J. B. Creighton,) it only being my invention to use two backs (either hinged to brackets or left loose so as to merely rest on their edges and against inclosing partitions) for this purpose.

Therefore, I claim—

In connection with a pair of car-seats, B B, which are placed within and against two partitions, A A, and arranged at a proper distance apart and facing each other, the use of two cushioned backs, C C, so that they, when standing on edge and resting against the partitions, form, with the bottom cushions, comfortable seats for passengers, and when adjusted so as to lie horizontally on a level with the bottom cushions within the space existing between the two seats form, with the bottom cushions and the partitions, a comfortable inclosed sleeping-couch, substantially as set forth.

ELI WHEELER.

Witnesses:
S. G. COMSTOCK,
N. L. NORTH.